UNITED STATES PATENT OFFICE.

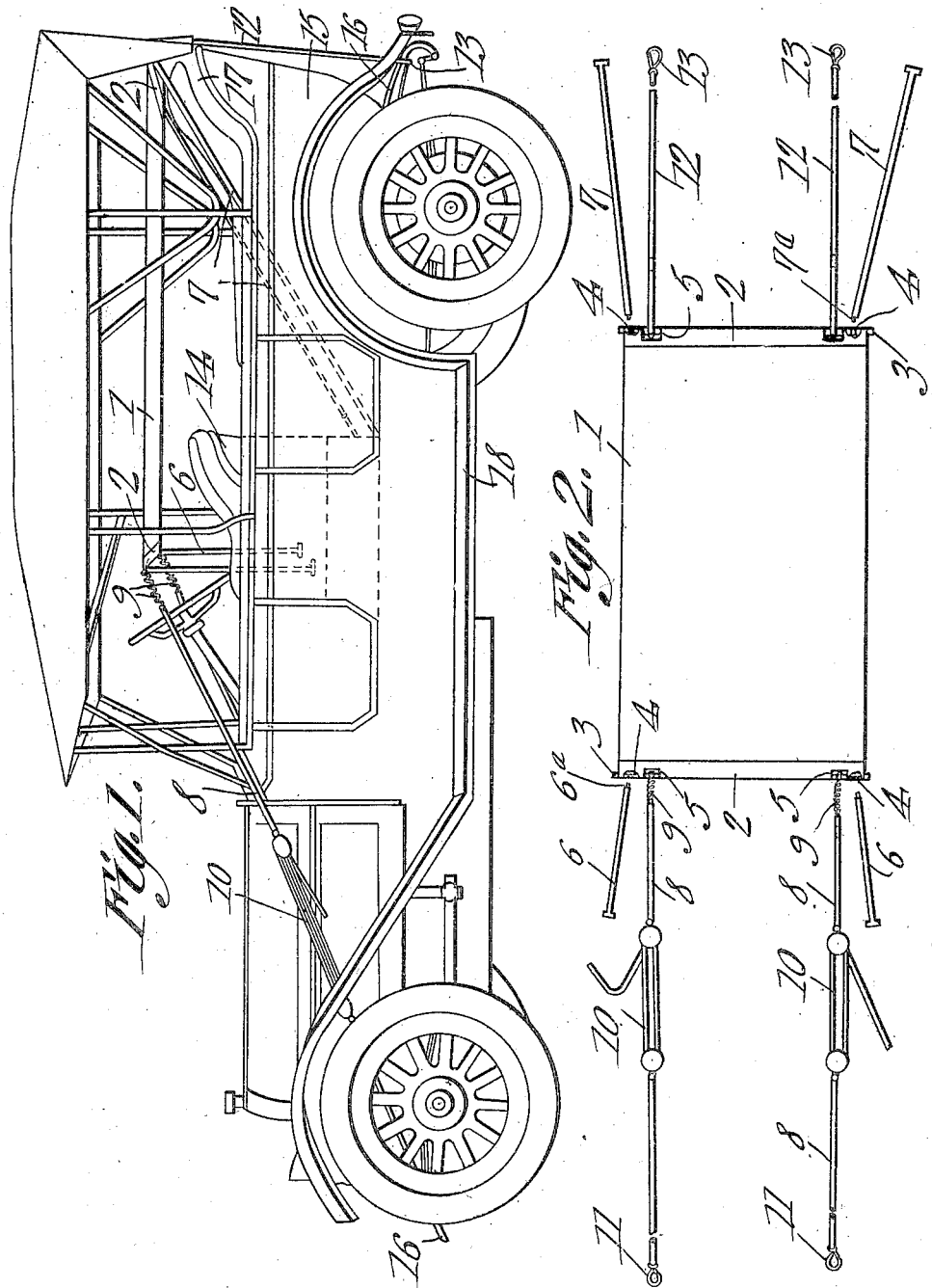

RALPH LEONARD BRADLEY, OF STEILACOOM, WASHINGTON.

STRETCHER OR BED FOR AUTOMOBILES.

1,082,223.

Specification of Letters Patent.

Patented Dec. 23, 1913.

Application filed May 9, 1913. Serial No. 766,654.

*To all whom it may concern:*

Be it known that I, RALPH LEONARD BRADLEY, a citizen of the United States, residing at Steilacoom, in the county of Pierce and State of Washington, have invented a new and useful Stretcher or Bed for Automobiles, of which the following is a specification.

The present invention appertains to an attachment for automobiles, and relates more particularly to a stretcher or bed applicable to an automobile in a novel manner.

It is the object of the present invention to provide a novel and improved attachment of the nature indicated which may be readily applied to an automobile, and which shall serve as a convenient and efficient stretcher or bed, thus permitting the automobile to be converted to an ambulance or bed, when circumstances necessitate.

The present invention also comprehends the provision of a device of the nature indicated which may be attached to the automobile in a peculiar or unique manner, so that the strain will be properly transmitted to the body or chassis of the machine, without straining the tonneau or other weaker portions of the automobile and without injuring or marring the automobile.

Another object of the present invention is to provide a device of the character specified which may be readily collapsed or folded so as to be stowed away within a small compass.

A further object of the present invention is to provide a bed or stretcher of such construction and proportions that it may efficiently serve its purposes, and in order that the same may be attached to the automobile in an efficient manner, it being observed that the application of the device of the present character to an automobile is surrounded with a number of difficulties due to the standardization of automobiles.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention can be made within the scope of what is claimed, without departing from the spirit of the invention.

The present invention has been illustrated in its preferred embodiment, in the accompanying drawing, wherein:—

Figure 1 is a perspective view of an automobile, showing the improved stretcher or bed applied thereto. Fig. 2 is a plan view of the present invention showing the same dismembered.

In carrying out the present invention, reference being had in detail to the drawing, there is provided a rectangular body 1 which is of suitable size, and which is constructed of canvas, or other textile or fabric possessing the requisite properties. The ends of the body 1 are provided with the hems 2 through which a pair of cross rods 3 are passed. The cross rods 3 are provided with the sockets 4 adjoining their ends and opening through the hems 2, and each hem 2 is provided with a pair of openings 5 adjoining its ends or adjoining the sockets 4, the openings 5 exposing the rods 3. A pair of supports or legs 6 are provided for the front rod 3, while a pair of supports 7 are provided for the rear cross rod 3. The respective supports 6 and 7 are provided with the pins or tenons 6ª and 7ª, respectively, which are adapted to engage in the sockets 4 provided in the respective cross rods 3. The forward supports 6 are relatively short while the rear supports 7 are relatively long. These supports, especially the rear supports, may be jointed or extensible in order that they may be folded compactly when not in use, and in order that they may be extended or opened to accommodate various automobile bodies. Guys 8 are attached to the front cross rod 3, coiled wire springs 9 being preferably interposed between the inner ends of the guys 8 and the cross rod 3, and the springs 9 being attached to the cross rod within the openings 5. A suitable block and tackle 10 is interposed or inserted in each guy 8, and the guys 8 are provided with the snap hooks or attaching members 11 at their free ends. The guys 12 are attached to the rear cross rod 3, within the openings 5 of the respective hem 2, and are also provided at their free ends with the snap hooks or other attaching members 13. The respective guys are preferably composed of rope, the inherent flexibility and slight elasticity of which assists in yieldably supporting the body 1 to a desirable, but limited extent.

In applying the stretcher or bed to an automobile, the forward supports 6 have their feet or lower ends engaged to the front seat 14 or upon the floor or bottom of the car body in advance of the front seat 14, and the lower ends of the feet of the rear supports 7 are engaged within the corner between the back of the seat 14 and the floor or bottom of the car body, the rear supports standing diagonally or in an inclined position, so that the upper ends of the supports 7 and the rear end of the body 1 will stand above the tonneau. In this manner, the rear end of the body 1 will project rearwardly over the tonneau 15, which not only permits the body 1 to be of sufficient length, but will permit the rear guys to be attached to the rear end of the chassis 16 by means of the snap hooks 13. The forward guys 8 are attached to the forward end of the chassis 16 by means of the snap hooks 11, the body 1 then being drawn taut by means of the block and tackle 10 at each side.

In the larger machines or automobiles, the front supports 6 are designed to rest on the front seat 14, while in smaller machines, the said supports will more properly rest upon the floor or bottom of the car body in advance of the front seat, the rear supports in each case engaging in back of the seat 14 as specified. When the device is thus attached or applied to the automobile, the body 1 will be supported in an efficient manner, it being noted that the springs 9 provide a sufficient resiliency for the body 1 to the comfort of the occupant or occupants.

One of the novel features of the present device is the arrangement of the rear supports 7 which permits the rear end of the body 1 to extend over, but out of contact with, the rear seat 17, and which permits the rear guys 12 to be fastened to the rear end of the chassis outside of the tonneau. The supports 7 also permit the rear end of the body 1 to vibrate vertically to a limited extent, the forward supports 6 permitting the body 1 to vibrate longitudinally so that the combined vibration of the front and rear supports will render the stretcher or bed most comfortable. The arrangement of the front and rear supports will also transmit the strain to the stronger portion of the car body, it being observed that the tonneau is under no strain whatever. The body 1 will be maintained taut or in a stretched condition and will not sag under any conditions, notwithstanding the longitudinal and vertical resiliency of the body 1.

The present attachment may be applied to the automobile or machine within the usual top, so that the side curtains may be let down to insure privacy, the present device not interfering with the top.

When the structure or bed is not in use, the same may be compactly folded or stored away, the supports being detachable by withdrawing the pins or tenons 6ª and 7ª from the cross rods 3 after the guys have been detached from the chassis. The supports can then be clamped or otherwise held under the running boards 18 or at any other suitable point, while the body 1 together with the guys can be rolled up and stored under the rear seat or any other suitable compartment for that purpose. The device may also be readily and quickly set up, when circumstances necessitate, so that the automobile may be quickly converted into an ambulance or a bed.

From the foregoing taken in connection with the drawing, the advantages and capabilities of the present device will be apparent to those versed in the art, it being noted that the objects have been carried out satisfactorily, and that the present device provides a serviceable and efficient one for the purposes for which it is designed.

Having thus described the invention, what is claimed as new is:—

1. In a device of the character described, a body, perpendicular supports for the front end of the body and designed to rest upon the front seat of an automobile, inclined rear supports for the body designed to rest against the back of the front seat, and guys attached to the ends of the body and designed for attachment to the front and rear ends of the chassis of the automobile.

2. In a device of the character described, a body, short perpendicular supports for the front end thereof and designed to rest upon the front seat of an automobile, inclined rear supports for the body designed to rest against the back of the front seat, the upper ends of the rear supports and the rear end of the body being adapted to project over the rear seat of the automobile, guys attached to the rear end thereof and designed to be attached to the rear end of the chassis of the automobile, and guys attached to the front end of the body and designed to be attached to the front end of the chassis, the last mentioned guys including means for stretching the body.

3. In a device of the character described, a body, front and rear supports therefor, the front supports being adapted to rest upon the front seat of an automobile, and the rear supports being inclined and being designed to rest against the back of the front seat, front and rear guys attached to the ends of the body and designed for attachment to the front and rear ends of the chassis of the automobile, and resilient members interposed in the front guys.

4. In a device of the character described, a flexible body having a hem at each end, cross rods passing through the hems, front and rear supports attachable to the cross rods, the front supports being adapted to rest upon the front seat of an automobile, and the rear supports being inclined and being designed to rest against the back of the front seat, and front and rear guys attached to the respective cross rods and designed for attachment to the front and rear ends of the chassis.

In testimony that I claim the foregoing as my own, I have hereto affixed my signature in the presence of two witnesses.

RALPH LEONARD BRADLEY.

Witnesses:
M. BAIR,
F. H. CHELIUS.

Copies of this patent may be obtained for five cents each, by addressing the "Commissioner of Patents, Washington, D. C."